(12) United States Patent
Arnetoli (10) Patent No.: US 6,944,954 B1
(45) Date of Patent: Sep. 20, 2005

(54) GRASS-CUTTING HEAD WITH RELOADING OF THE LINE WITHOUT REMOVAL OF THE SPOOL

(75) Inventor: Fabrizio Arnetoli, Florence (IT)

(73) Assignee: Arnetoli Motor di Arnetoli Fabrizio, Florence (IT)

( * ) Notice: Subject to any disclaimer, the term of this patent is extended or adjusted under 35 U.S.C. 154(b) by 0 days.

(21) Appl. No.: 09/348,069

(22) Filed: Jul. 6, 1999

(30) Foreign Application Priority Data

Jul. 6, 1998 (IT) .............................. FI98A0163

(51) Int. Cl.⁷ ...................... A01G 3/06; A01D 34/416; B65H 75/02
(52) U.S. Cl. ............................ 30/276; 30/347; 56/12.7
(58) Field of Search ................... 30/276, 347; 56/12.5, 56/12.7, 295

(56) References Cited

U.S. PATENT DOCUMENTS

| | | | | |
|---|---|---|---|---|
| 4,168,572 A | * | 9/1979 | Ewing | 30/276 |
| 4,274,201 A | | 6/1981 | Oberg et al. | 30/276 |
| 4,524,515 A | | 6/1985 | Oberg | 30/276 |
| 4,566,189 A | * | 1/1986 | Muto | 30/276 |
| 4,584,771 A | | 4/1986 | Tilltson | 30/276 |
| 4,625,501 A | * | 12/1986 | Baba | 30/276 X |
| 4,823,465 A | | 4/1989 | Collins | 30/276 |
| 4,882,843 A | | 11/1989 | Baba | 30/276 |
| 4,893,410 A | | 1/1990 | Hoffmann et al. | 30/276 |
| 5,095,688 A | | 3/1992 | Fabrizio | 56/12.7 |
| 5,109,607 A | | 5/1992 | Everts | 30/276 |
| 5,490,641 A | * | 2/1996 | Worthing | 30/276 X |
| 5,659,960 A | * | 8/1997 | Everts et al. | 30/276 |
| 5,671,536 A | * | 9/1997 | Everts et al. | 30/276 |
| 5,806,192 A | * | 9/1998 | Everts et al. | 30/276 |

FOREIGN PATENT DOCUMENTS

| | | |
|---|---|---|
| EP | 0 467 006 A1 | 1/1992 |
| EP | 0 784 919 | 7/1997 |
| FR | 2 623 365 | 5/1989 |
| FR | 2 649 284 | 1/1991 |
| GB | 2 078 075 | 1/1982 |
| WO | WO 96/21345 | 7/1996 |
| WO | WO 97/29627 | 8/1997 |

* cited by examiner

Primary Examiner—Clark F. Dexter
(74) Attorney, Agent, or Firm—McGlew and Tuttle, P.C.

(57) ABSTRACT

A grass-cutting head (1) including: a housing (3); and at least one spool (5) placed in the housing and on which a cutting line (F) can be wound. The spool is accessible from the outside to enable a supply of cutting line to be wound onto it without taking said spool out of the housing. A stop is provided to hold the spool in the housing while the supply of cutting line is being wound onto the spool.

36 Claims, 11 Drawing Sheets

GRASS-CUTTING HEAD WITH RELOADING OF THE LINE WITHOUT REMOVAL OF THE SPOOL

TECHNICAL FIELD

The present invention relates to a grass-cutting head for brushcutters or similar appliances.

More specifically, the invention relates to a grass-cutting head of the type that comprises a housing, at least one spool placed in the housing and on which one or more cutting lines can be wound, and a mechanism for feeding the cutting line from the spool to restore the length of the cutting line projecting from the housing following wear due to the use of the head, and in which the feed mechanism includes a spring-action member.

STATE OF THE ART

Heads of the kind indicated above are widely used in this sphere. Examples of this kind of head are disclosed in U.S. Pat. No. 5,095,688, U.S. Pat. No. 4,823,465, U.S. Pat. No. 4,893,410, U.S. Pat. No. 4,882,843, U.S. Pat. No. 4,274,201, U.S. Pat. No. 4,584,771 and U.S. Pat. No. 4,524,515.

All these heads possess systems for lengthening the line (i.e. a feed mechanism) with spring-action members which act on a moveable slider or directly on the spool.

When the line wound on the spool is exhausted owing to having been repeatedly lengthened to restore the length of line projecting from the head, it becomes necessary to open the housing and remove the spool in order to wind a new supply of line onto it. This operation is very difficult because of the presence of the spring-action member which, as soon as the housing is opened, ejects the actuating slider used to lengthen the line, or ejects the winding spool. Afterward, closing the head is a complicated and trying operation. Even the winding of the line onto the spool is a trying and problematic operation, as the turns of cutting line tend to overlap during winding. This leads to jamming later, when the cutting line is being fed out during use.

OBJECTS AND SUMMARY OF THE INVENTION

It is an object of the present invention to provide a grass-cutting head that does not exhibit the drawbacks of conventional heads. More specifically, it is an object of the present invention to provide a grass-cutting head that will make the winding of a supply of line onto the spool an easy process.

Basically, according to the invention the head is so configured that the spool is accessible from the outside to enable a supply of cutting line to be wound onto it without taking the spool out of the housing, means being provided to hold the spool in the head when the latter is opened to make the spool accessible for reloading of the line. During winding, the cutting line is advantageously passed through the feed bushings, in the opposite direction to the normal direction of feed during use.

Particular advantages are achieved when the grass-cutting head possesses a cutting line feed mechanism of the type comprising a spring-action member. In this version, retention members prevent the spring-action member and/or the spool which the latter acts upon and/or other parts of the feed mechanism from escaping from the housing in the head when the head is opened to insert the ends of the supply of line into the spool.

It thus becomes possible to load the cutting line into the spool while keeping the latter in its seat inside the head, avoiding the need to remove and refit the spool and/or parts of the feed mechanism thereof. Besides the advantage of an easier and quicker reloading operation, the line is wound more evenly onto the spool, without overlapping of the turns, as the line is correctly guided by the feed bushings of the head during winding of the line.

In an especially advantageous embodiment, the retention members comprise anti-rotation means that allow manual rotation of the spool in the line winding direction so that the supply of cutting line is wound onto it, and that prevent or otherwise obstruct spontaneous rotation of the spool in the line unwinding direction. These anti-rotation means facilitate the winding of the supply of line onto the spool.

In one possible embodiment, the grass-cutting head comprises a feed mechanism that has stop teeth integral with the spool and arresting stops engaging with said teeth to define angularly offset positions of said spool. An actuating slider is provided to cause an angular step by step rotation of the spool inside the housing in the cutting line unwinding direction when the head is spinning. The action of the actuating slider is opposed by the spring-action member, which forms a slider return means.

The feed mechanism may also be of the automatic type.

The slider can act on an axially moveable spool that carries two series of stop teeth which engage with corresponding stops or groups of stops integral with the housing. Alternatively, in a different embodiment, the stop teeth may again be integral with the spool, which however is situated in a fixed axial position, while the stop teeth engage with a moveable slider comprising the stops that engage with the teeth on the spool.

In this version the housing may comprise a first portion through which there extends an axial hub that transmits the rotary drive to the grass-cutting head. Inside this housing portion is the spool from which the line is fed through bushings in the circumferential wall of the housing portion. A support is also provided for the spool mounted on the axial hub and elastically pressed against the first housing portion. The support retains the spool inside the housing. Said support possesses axially elongate openings through which pass the moveable stops carried by the actuating slider. The moveable stops engage with the teeth on the spool. An annular cover is also provided in order to close the housing around the spool support.

The spool support may comprise, in an especially advantageous embodiment, end teeth engaging with the corresponding end teeth on the housing portion, thus forming anti-rotation means which prevent or obstruct spontaneous rotation of the spool in the unwinding direction. The teeth may be shaped so as to allow rotation of the spool support in the winding direction and prevent rotation in the opposite direction. As an alternative to the two sets of end teeth, inserts made of friction material may be used to increase the coefficient of friction.

In a different embodiment, the spool is axially moveable under the action of an actuating slider, against which the spring-action member of the line feed mechanism acts. When pushed by the spring-action member, which also acts on the spool, the latter is held against the retention members which in this case are integral with the housing. The anti-rotation means that prevent or otherwise obstruct rotation of the spool in the cutting line unwinding direction may be arranged between the spool and the retention members.

These anti-rotation means may comprise a layer of friction material or teeth of various shapes.

The retention members may take various forms, some of which will be described in greater detail with reference to the examples of embodiments illustrated in the appended drawings.

Other advantageous embodiments and features of the grass-cutting head according to the invention are indicated in the appended dependent claims and will be described in greater detail with the aid of the drawings.

BRIEF DESCRIPTION OF THE DRAWINGS

A clearer understanding of the invention will be gained from the description and from the attached drawing, which shows a practical, non-restrictive example of an embodiment of the invention. In the drawing.

DETAILED DESCRIPTION OF PREFERRED EMBODIMENTS OF THE INVENTION

Figure 1:
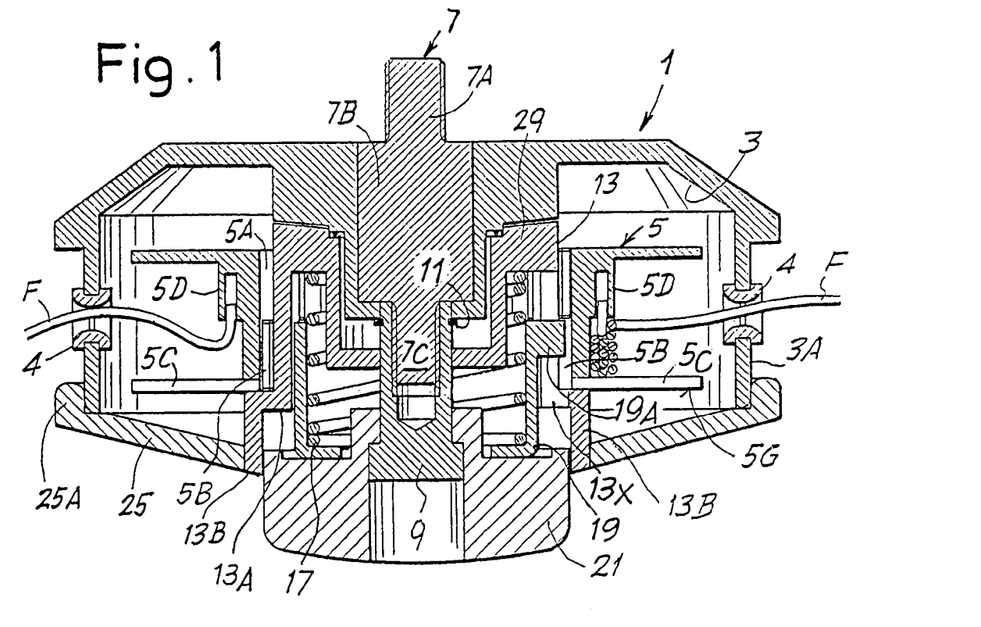
FIG. 1 shows an axial section through a head in a first embodiment of the invention.
Figure 2:
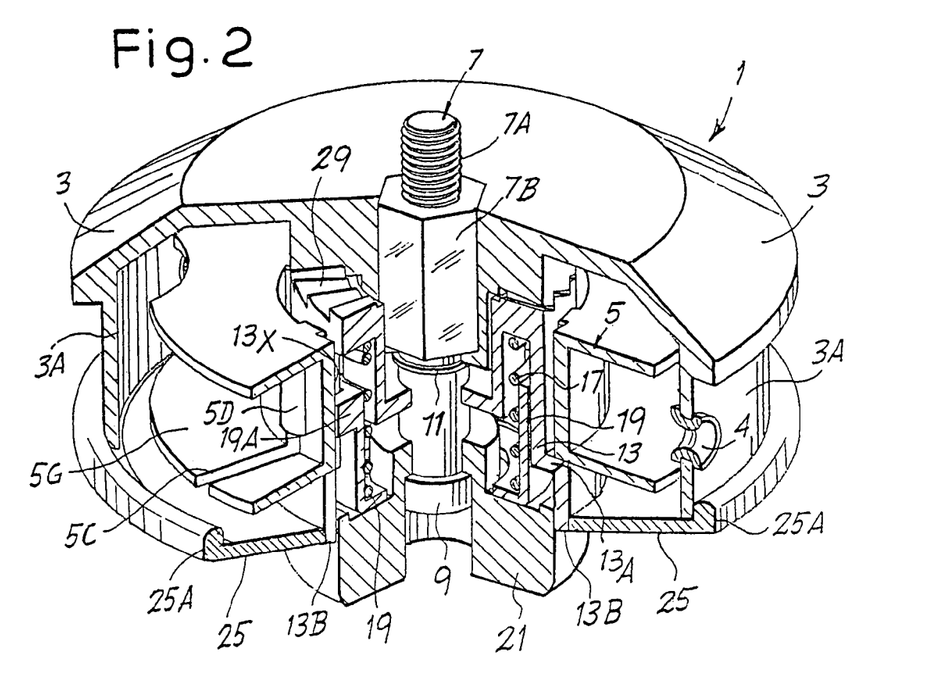
FIG. 2 shows a sectioned perspective view of the head shown in FIG. 1.

A first embodiment of the head according to the invention is illustrated in FIGS. 1 and 2. The head has the general reference 1 and comprises a housing 3 containing a spool 5 on which is wound a cutting line F, depicted as a series of turns in the longitudinal section of FIG. 1.

The housing 3 has a cylindrical circumferential wall 3A with bushings 4 through which the cutting line F passes out. Extending axially through the inside of the housing 3 is a hub 7 with a threaded portion 7A and a hexagonal-section portion 7B coupled in torsion inside the through seat formed in the housing 3. The hub 7 is locked to the housing 3 by a journal or stop 9 that screws onto a second threaded portion 7C of the hub 7 and that has an elastic ring 11.

Fitted onto the hub 7, and journal 9 is a stop component 13 that forms a support for the spool 5, being provided with a collar 13A on which the spool 5 sits. The support 13 is held against the housing 3 by a spring-action member consisting of a helical spring 17 housed in a cylindrical seat formed in the support 13. Inside this cylindrical seat is a moveable actuating slider 19 with projections 19A that project through longitudinal slots 13X in the cylindrical wall of the support 13.

The projections 19A form stops acting on two series of teeth 5A and 5B which are offset relative to each other angularly and axially inside the through hole of the spool 5.

The actuating slider 19 is pushed by the spring-action member 17 against a knob 21 mounted on and retained by the journal 9.

The operation of the line feed mechanism, including the actuating slider 19, with its projections 19A the spring-action member 17 and the teeth 5A, 5B of the spool 5 is similar to that described in U.S. Pat. No. 5,095,688, and will therefore be described only briefly here. Pressing on the knob 21 compresses the spring-action member 17 and therefore moves the actuating slider 19 in such a way that the projections 19A of the latter disengage from teeth 5B and engage teeth 5A, which are offset angularly relative to teeth 5B. When this actuation is performed with the head 1 turning, the centrifugal force acting on the cutting line F turns the spool 5 until teeth 5A are stopped by the projections 19A. Releasing the knob 21 causes the actuating slider 19 to be moved back to the initial position (illustrated in FIGS. 1 and 2) by the spring-action member 17, with consequent disengagement of teeth 5A and engagement of teeth 5B by the projections 19A as a result of a further angular rotation of the spool 5 due to centrifugal force.

Each time the knob 21 is pressed, therefore, the spool 5 turns through an angle equal to twice the offset between the teeth 5A and 5B.

Around the collar 13A supporting the spool 5 is a basically cylindrical closing wall 13B on which is mounted an annular cover 25. This cover has an edge 25A that surrounds the free edge of the circumferential wall 3A of the housing 3. The cover 25 may be held in position by its interference with the closing wall 13B and/or by interference between the edge 25A and the circumferential wall 3A, or by means of spring-action projections (not shown in FIGS. 1 and 2).

During the operation of the head, which for this purpose is fitted to the rotating hub of a brushcutter via the threaded portion 7A of the hub 7, and revolved with the lines F projecting from the bushings 4, the cutting lines F wear away and it therefore becomes necessary to restore the cutting lines projecting from the head 1 to their correct length by depressing the knob 21 and thus operating the actuating slider 19. After repeated line feed operations, when the line is exhausted, a new supply of cutting line F must be wound onto the spool 5.

To do this, it is sufficient to remove the annular cover 25 to give access from below to a pair of anchor holes 5D for the ends of the cutting line F. The anchor holes 5D are in line with slots 5C in the lower flange 5G of the spool 5. The initial end of the new supply of line can be passed through the bushings 4 and through the radial slots 5C to allow the operator to grasp it in the area made accessible by the removal of the annular cover 25, and then insert it in the corresponding anchor hole 5D.

Having secured the ends of the line in the holes 5D, the operator, by twisting the closing wall 13B of the spool support 13, can rotate, in the winding direction, the assembly made up of the button 21, the actuating slider 19, the support 13 and the spool 5 around the hub 7 axis. Rotation in the winding direction is permitted by the shaping of sawtooth section end teeth 29 formed on that portion of the support 13 which is pushed against the housing 3, the latter having complementary teeth, as can be seen in particular in the cutaway view, FIG. 2.

The reverse rotation between the support 13 and the housing 3 (the direction in which the line in unwound) is not permitted, so that spontaneous rotation in the line unwinding direction is prevented, not only during rewinding of the supply of line but also when the head is in operation. The teeth 29 and the complementary teeth on the housing 3 thus form an anti-rotation means for rotating in a winding direction, but not in an unwinding direction.

The system of mutual locking between the housing 3, the support 13 and the knob 21 may differ from this. For example, the central hub 7 may be omitted and the connection may be provided by a system of spring-action fingers. Similarly, the connection between the head and the brushcutter may be provided by a snap-engaging quick-coupling system or the like, of a type known per se, rather than by means of a threaded journal. Similarly, the knob 21 and the actuating slider 19 may be constructed in one piece. The journal 9 may be screwed in by a socket wrench passing through a hole in the knob 21, or the latter may be coupled in torsion to the journal 9 to enable it to rotate.

Figure 2A:
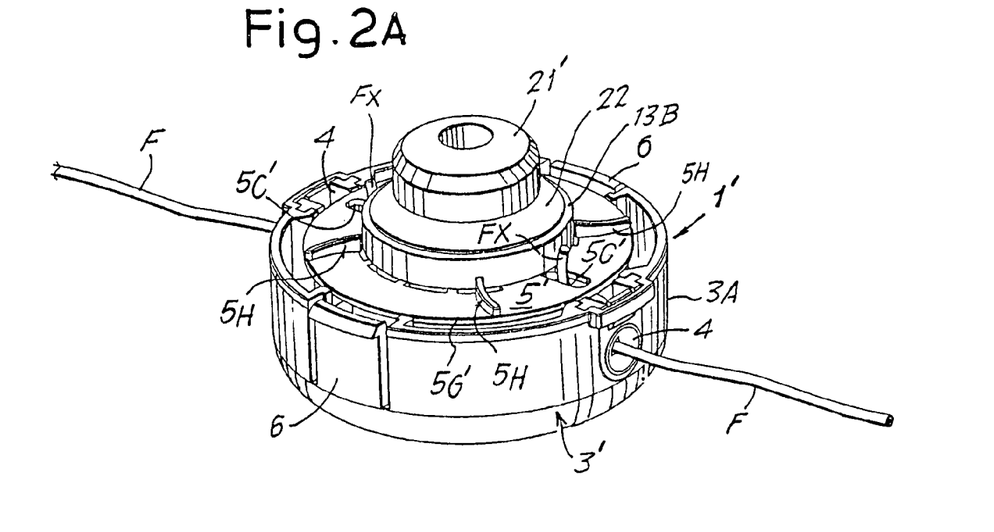
FIGS. 2A and 2B show two perspective views of a head similar to the head of FIGS. 1 and 2, during the insertion of a supply of cutting line.
Figure 2B:
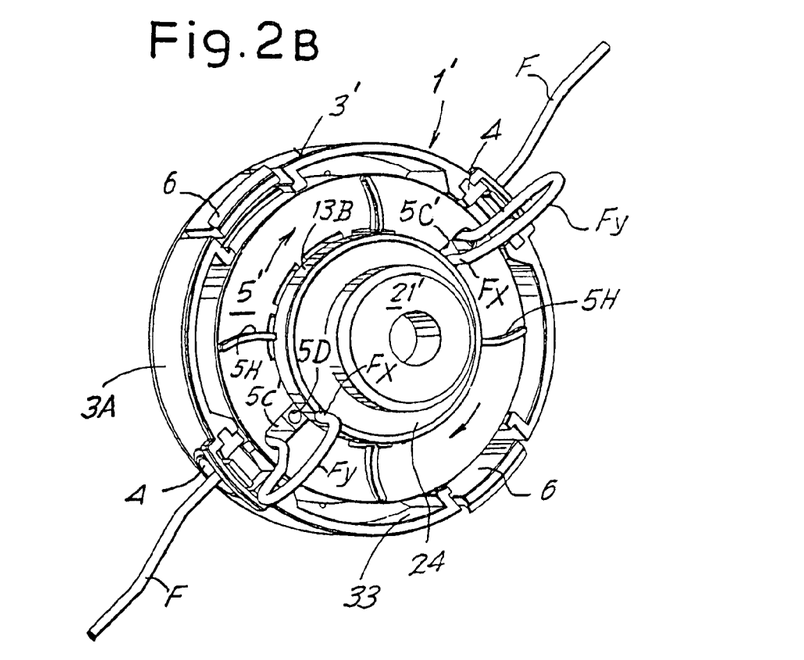

FIGS. 2A and 2B show a perspective view of a modified housing 3' of a head 1' equivalent to the head shown in FIGS. 1 and 2 in the open condition and show the operation of inserting a new supply of cutting line F. Parts identical or equivalent to those of FIGS. 1 and 2 are indicated by the same reference numbers. The annular cover 25 has been removed to allow access from the outside to the underside of the spool 5. This spool has slots 5C' which are closed off toward the edge of the respective flange of the spool, rather than open as in FIG. 1. Also, the lower flange 5G' of the spool 5 is provided on its outermost surface with arcuate projections 5H to facilitate the winding of the new supply of cutting line F by hand. The knob 21' is made of a smaller diameter than the knob 21 of FIGS. 1 and 2, and a protective membrane 22 is arranged between it and the annular closing wall 13B of the support 13.

Also shown in FIGS. 2A and 2B are spring-action tabs 6 formed integrally with the housing 3. These are for fastening the annular cover 25 (omitted in FIGS. 2A and 213) in place.

FIG. 2A shows the ends Fx of two lengths of cutting line F that have been passed from the outside of the housing 3 in through the bushings 4. The ends Fx project out through the slots 5C' and can therefore be grasped by the user, pulled further to draw more line F through the bushings 4 and then inserted—thereby forming a loop Fy (FIG. 2B)—in the anchor holes 5D. The line F can then be pulled radially from the outside to take up the loop Fy and then be wound up by turning the spool 5 with the aid of the arcuate projections 5H.

Figure 3:
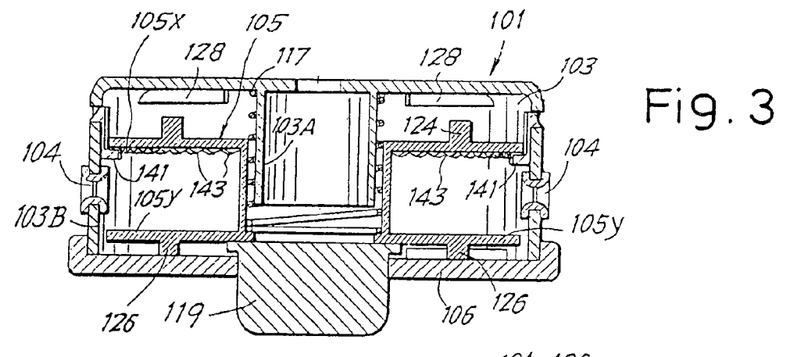
FIG. 3 shows an axial section through a head in a second embodiment.
Figure 4:
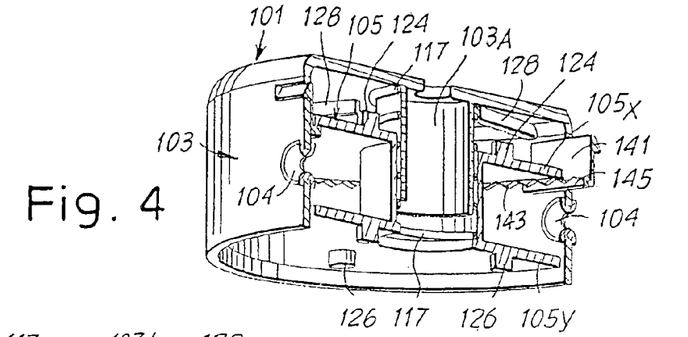
FIG. 4 shows a cutaway perspective view, with parts removed, of the head shown in FIG. 3.

FIGS. 3 and 4 show a different embodiment of the head according to the invention. The head, indicated by the general reference 101, comprises a housing made up of a main portion 103 and a lower cover 106. Inside the housing is a spool 105 with two annular flanges 105X and 105Y. The spool 105 includes a central through hole through which extends a cylindrical skirt 103A integral with the portion 103 of the housing. A spring-action component 117 in the form of a helical spring extends between the cylindrical skirt 103A and the inner wall of the axial through hole of the spool 105. The spring-action member pushes the spool 105 against a lower slider 119 projecting from the housing cover 106.

On the outside of the upper flange 105X of the spool 105 are a plurality of teeth 124 while on the outside of the lower flange 105Y are teeth 126 offset angularly relative to the teeth 124. The shape and the position of the teeth 126 can be seen particularly in FIG. 4 where for greater clarity the cover 106 and its projecting knob 119 have been removed.

The upper teeth 124 engage with stops defined by fingers 128 formed on the upper wall of the portion 103 of the housing containing the spool 105, while the lower teeth 126 engage with stops formed by similar fingers on the cover 106, though these latter fingers are not visible as they are offset at an angle of 90° to the fingers 128.

The circumferential wall 103B contains bushings 104 for the passage of the cutting line wound onto the spool 105, this line being omitted from the figure for greater clarity.

To restore the lengths of cutting line projecting from the bushings 104 to their correct length following wear due to operation of the head, pressure is applied to the actuating slider 119, while the head is turning, causing compression of the spring-action member 117 and therefore axial movement of the spool 105. This releases the teeth 126 from the lower stops and engages the teeth 124 with the upper stops 128. The angular offset between the teeth 124 and 126 and between their respective stops means that, as the spool 105 is traveling upward, said spool executes a rotary movement and a consequent unwinding of the line. This is caused by the centrifugal force acting on the line itself which continues until the teeth 124 meet the fingers 128. On releasing the actuating slider 119 the spring-action member 117 returns the spool 105 to the fully down position resulting in a second rotation of one step in the line-unwinding direction. This extender mechanism is known per se.

Once the supply of cutting line wound on the spool 105 is exhausted it must be replaced. In conventional heads this had to be done by removing the cover 106, the slider 119 and the spool 105, which resulted in the spring-action member 117 also escaping. In the head according to the invention, however, the spool 105 is held in place axially by tabs 141 fitted into corresponding slots in the circumferential wall 103B of the housing portion 103. The tabs 141 form a stop for the lower surface of the flange 105X of the spool 105, preventing the latter escaping when the cover 106 is removed. Removing the cover 106 and actuating slider 119 gives free access to the underside of the spool 105 to allow a new supply of line to be anchored in anchor holes similar to those marked 5D in FIGS. 1 and 2 and not shown, for simplicity of the drawing in FIGS. 3 and 4.

The spool 105 and the spring-action member 117 remain in their positions inside the housing portion 103. The line is wound in by, for example, pushing the teeth 126 and turning the spool in the winding direction, conveniently indicated by an arrow on the lower face of the flange 105Y of the spool. To prevent spontaneous unwinding of the spool, the spool is provided with teeth 143 on the lower surface of the upper flange 105X. The teeth 143 engage with corresponding teeth 145 on the tabs 141. Operating the spool 105 by hand to turn it in the winding direction exerts sufficient force to cause the teeth 143 to ride over the teeth 145 and thus slightly compress the spring-action member 117, thus causing the spool 105 to rotate in the winding direction. The resistance presented by the teeth 143, 145 and the force of the spring-action member 117 are sufficient to prevent spontaneous unwinding.

Figure 5:
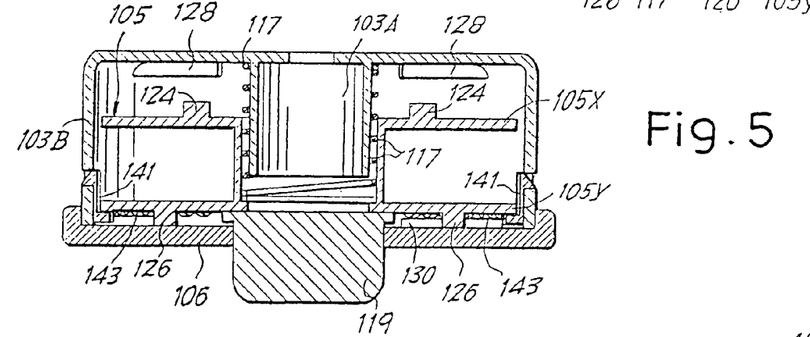
FIG. 5 shows a third embodiment of the head according to the invention in axial section.
Figure 6:
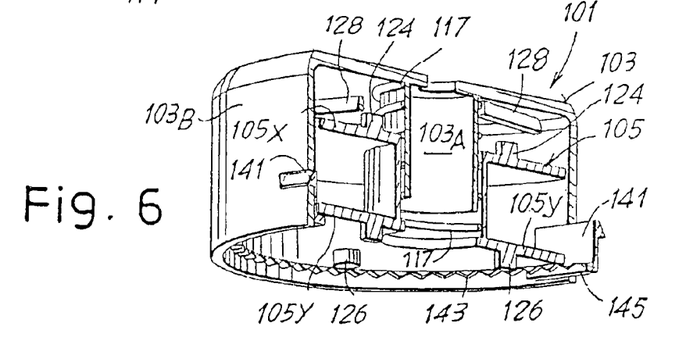
FIG. 6 shows a cutaway perspective view, with parts removed, of the head shown in FIG. 5.

FIGS. 5 and 6 show an embodiment equivalent to that of FIGS. 3 and 4 and identical parts are indicated by the same reference numbers. Here, the tabs 141 engage with teeth 143 on the lower face of the lower flange 105Y of the spool 105.

Figure 7:
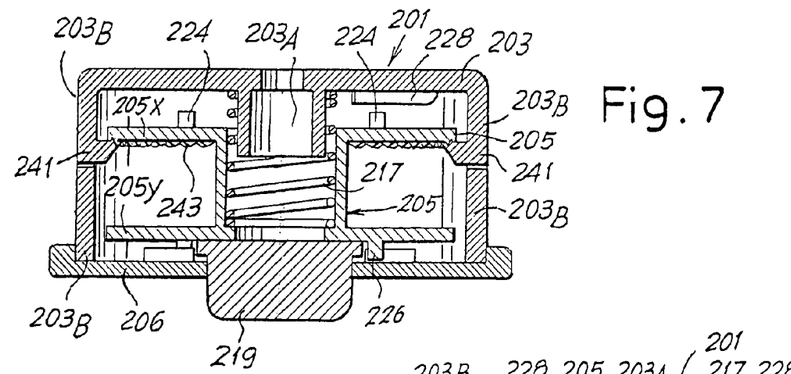
FIG. 7 shows a fourth embodiment of the head according to the invention in axial section.
Figure 8:
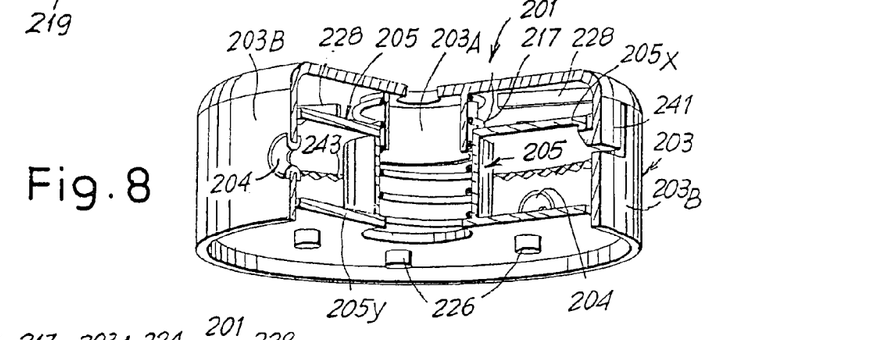
FIG. 8 shows a cutaway perspective view, with parts removed, of the head shown in FIG. 7.

FIGS. 7 and 8 show a variant of the head seen in FIGS. 3 and 4. Identical or corresponding parts are indicated by the same reference number increased by 100. So, for example, the head as a whole has the reference 201 and the housing portion 203. In this version the spool 205 is held in position, to prevent it from escaping when the cover 206 is opened, by spring-action tabs 241 formed integrally with the wall 203B of the housing portion 203. To simplify the drawing, FIG. 8 omits not only the cover 206 and the actuating slider 219 but also the spring-action member 217.

Figure 9:
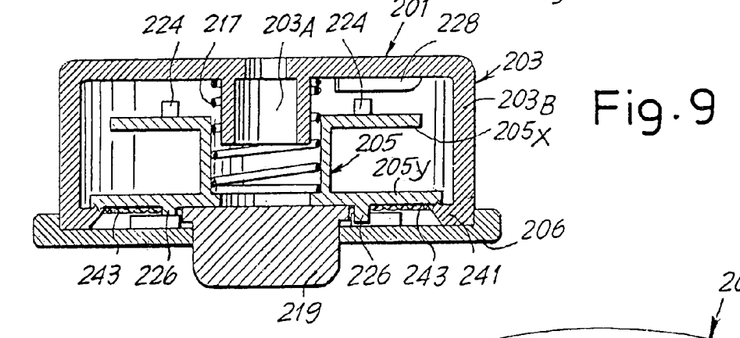
FIG. 9 shows an axial section through a modified form of the head shown in FIG. 7.
Figure 10:
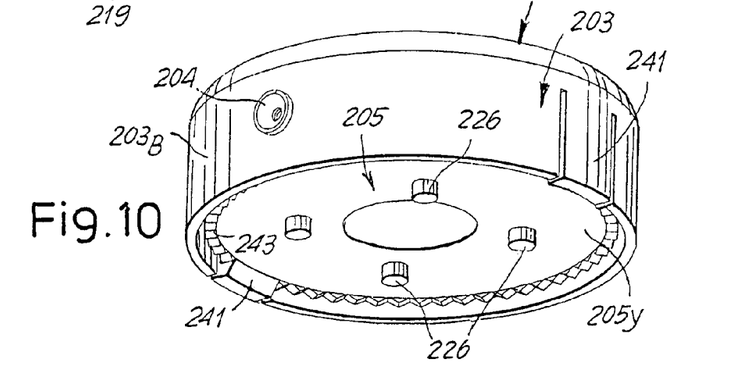
FIG. 10 shows a perspective view, with parts removed, of the head shown in FIG. 9.

Shown in FIGS. 9 and 10 is a variant of the head seen in FIGS. 7 and 8, in which the spring-action tabs 241, again formed integrally with the wall 203B of the housing portion 203, engage with the lower flange 205Y of the spool 205, rather than with its upper flange. Parts identical or corresponding to those of FIGS. 7 and 8 are indicated by the same reference numbers.

In the embodiments shown in FIGS. 3–10 the slider 119 or 219 may be formed in one piece with its respective spool 105, 205.

Figures 11, 12, 13:
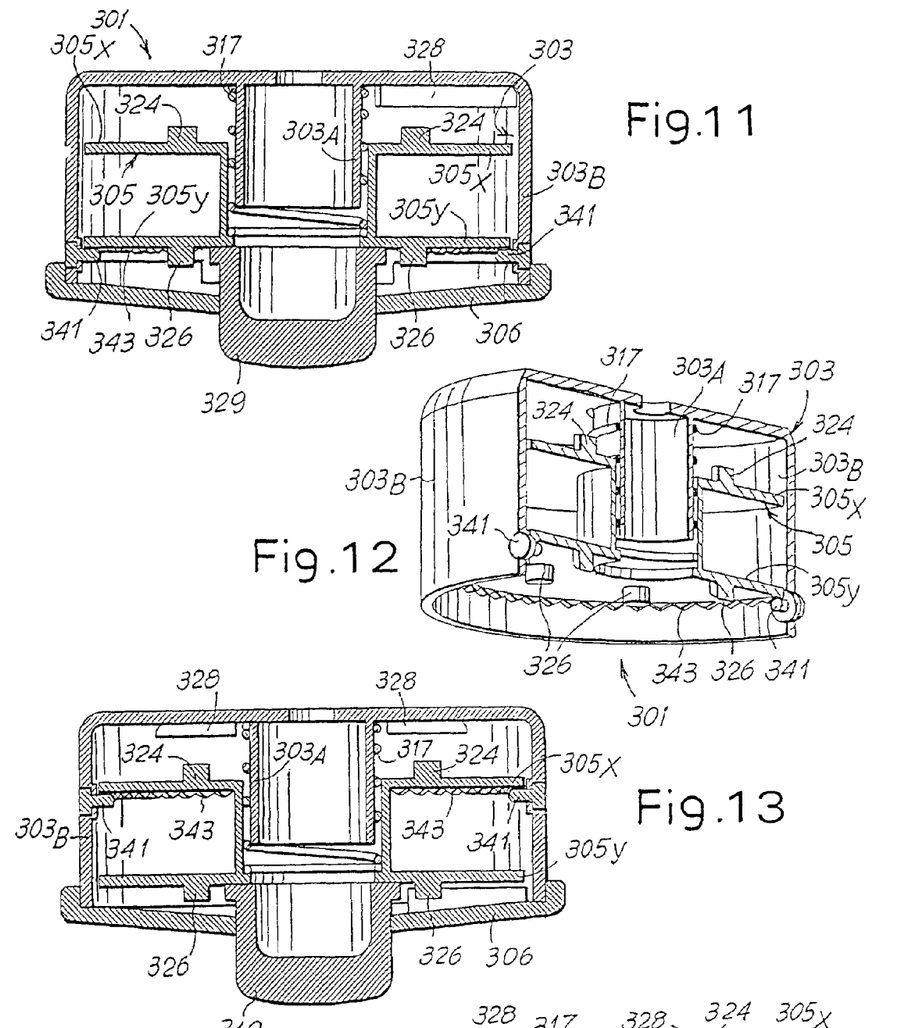
FIG. 11 shows another embodiment of the head according to the invention in an axial section.
FIG. 12 shows a cutaway perspective view, with parts removed, of the head shown in FIG. 11.
FIG. 13 shows an embodiment similar to that illustrated in FIG. 11.

FIGS. 11 and 12 show a variant of the head depicted in FIGS. 9 and 10. Identical or corresponding parts are indicated by the same reference numbers increased by 100 over the numbers given in the embodiment in FIGS. 9 and 10. In this version the lower flange 305Y of the spool 305 possesses teeth 343 that engage with pegs 341 inserted through the wall 303D of the housing portion 303. The pegs 341 have the same function as the tabs 241 and 141 of the earlier embodiments. The line feed mechanism is the same as that described above. The dimensions of the pegs 341 are such as to ensure, in conjunction with the teeth 343, the anti-rotation action of the spool 305 in order to prevent spontaneous unwinding. The pegs 341 or the tabs 141, 241 may also be replaced by other annular retention members built into the internal cylindrical wall of the housing portion of the head. The retention members act against the force of the spring to prevent the spring from escaping from the housing when the housing is open to enable the supply of cutting line to be wound on the spool. In the embodiment of FIG. 1, the retention members include the journal 9. In the embodiment of FIGS. 3–10, the retention members include the tabs 141 and 241. In the embodiment of FIGS. 11–13 the retention members include the pegs 341.

Figure 14:
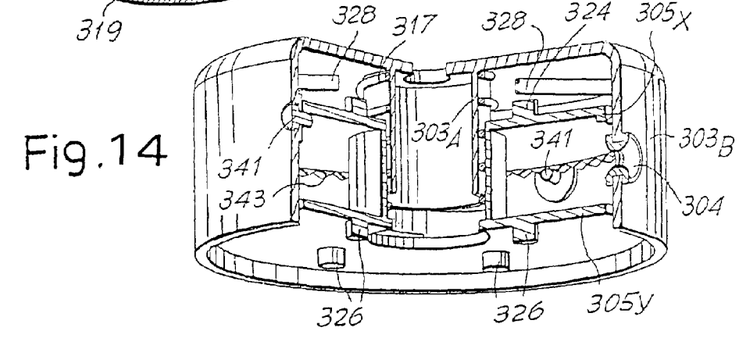
FIG. 14 shows a cutaway perspective view, with parts removed, of the head shown in FIG. 13.
Figure 15:
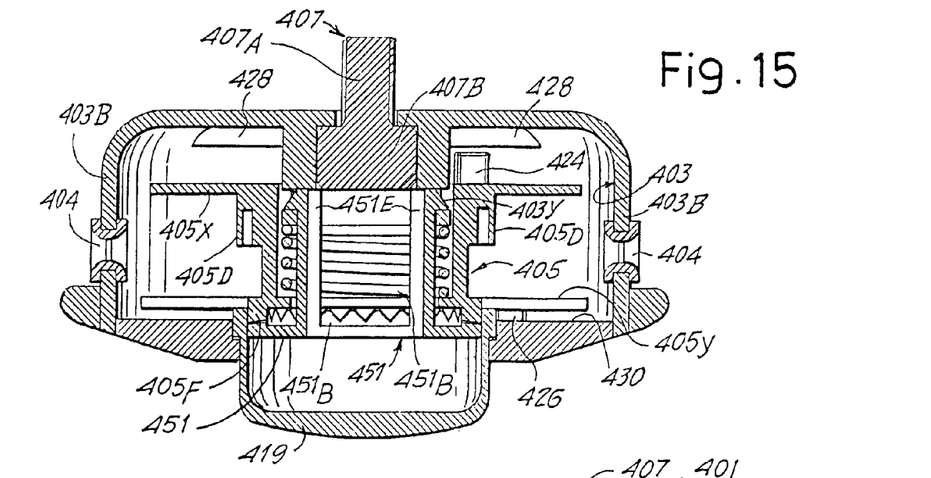
FIG. 15 shows another embodiment of the head according to the invention in an axial section.
Figure 16:
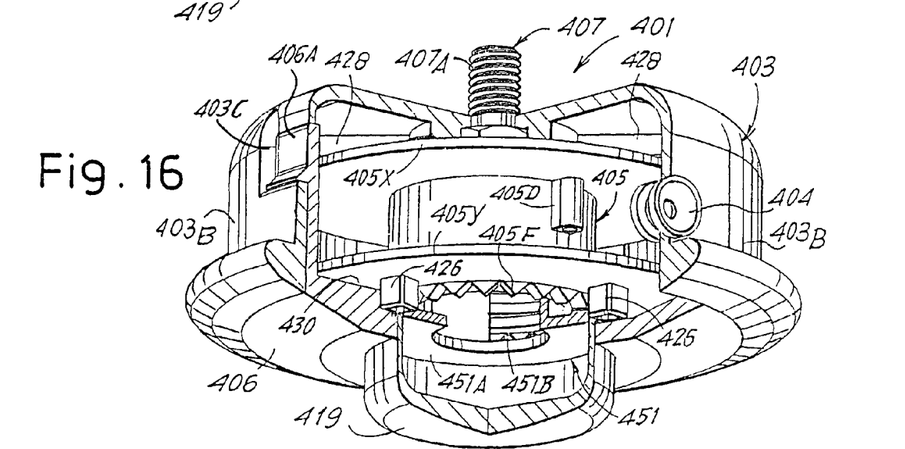
FIG. 16 shows a cutaway perspective view of the head shown in FIG. 15.
Figure 17:
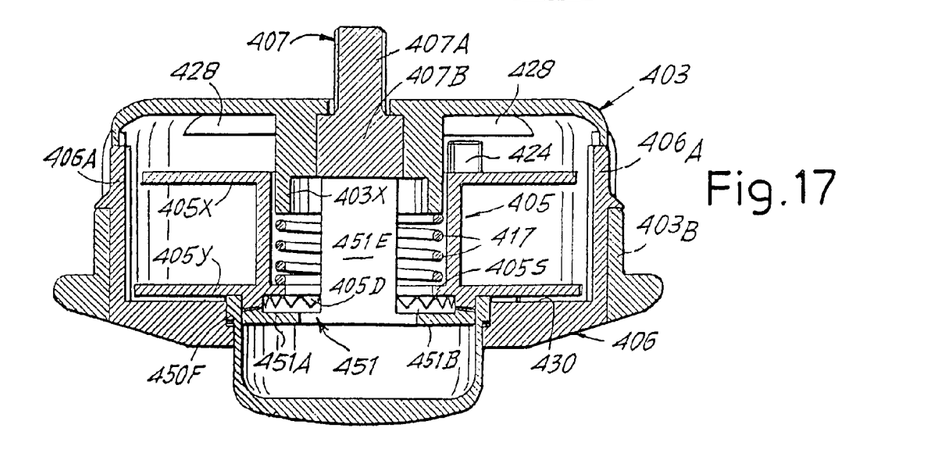
FIG. 17 shows an axial view on a different plane of the head shown in FIG. 15.
Figure 18:
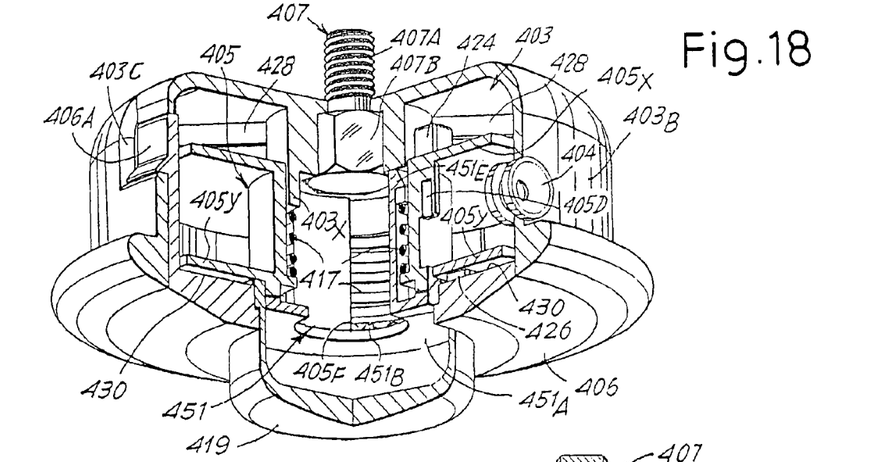
FIG. 18 shows a cutaway perspective view of the head shown in FIGS. 15 through 17, similar to FIG. 16, but in which the spool has been cut through to show the part of the extender mechanism.
Figure 19:
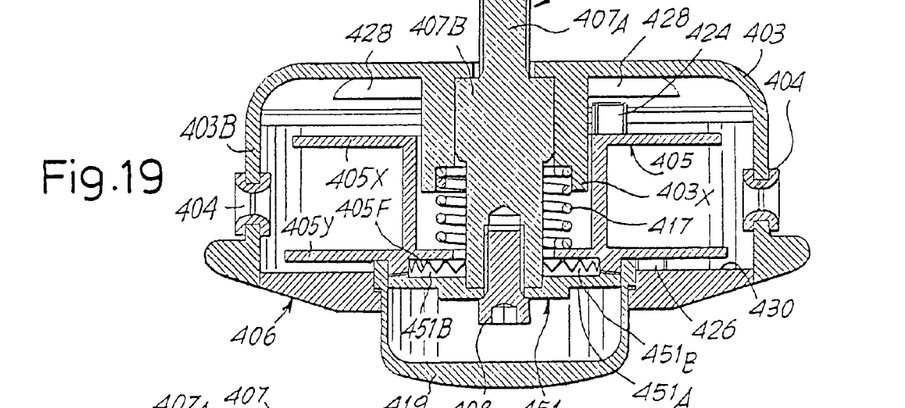
FIG. 19 shows another embodiment of the head according to the invention in an axial section.
Figure 20:
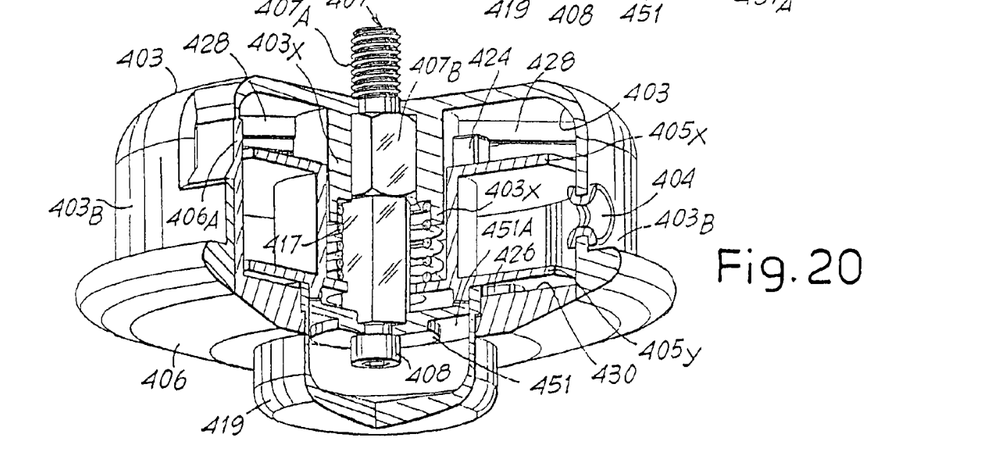
FIG. 20 shows a cutaway perspective view of the head shown in FIG. 19.
Figure 21:
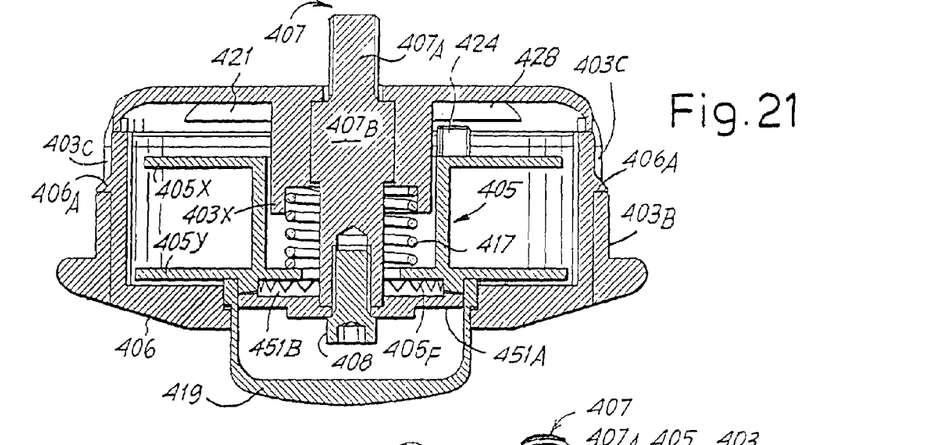
FIG. 21 shows the head shown in FIG. 19 in section on an axial plane taken at a different angle.
Figure 22:
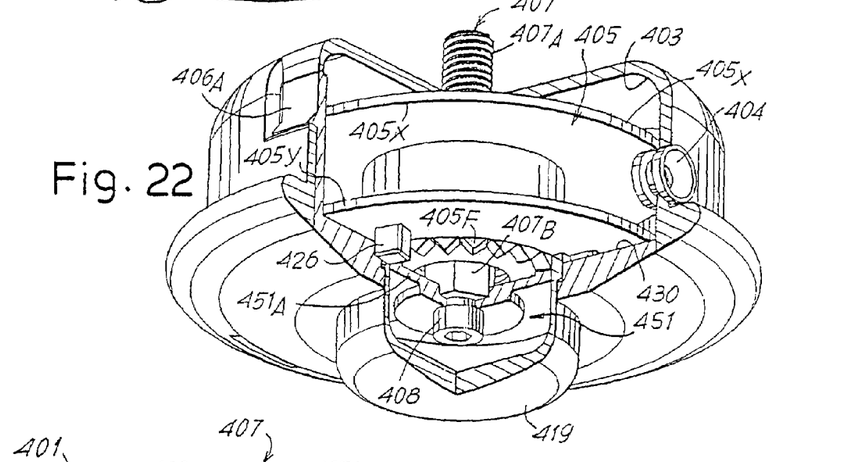
FIG. 22 shows a cutaway perspective view of the head shown in FIGS. 19 through 21 in a different angle to that of FIG. 20.
Figure 23:
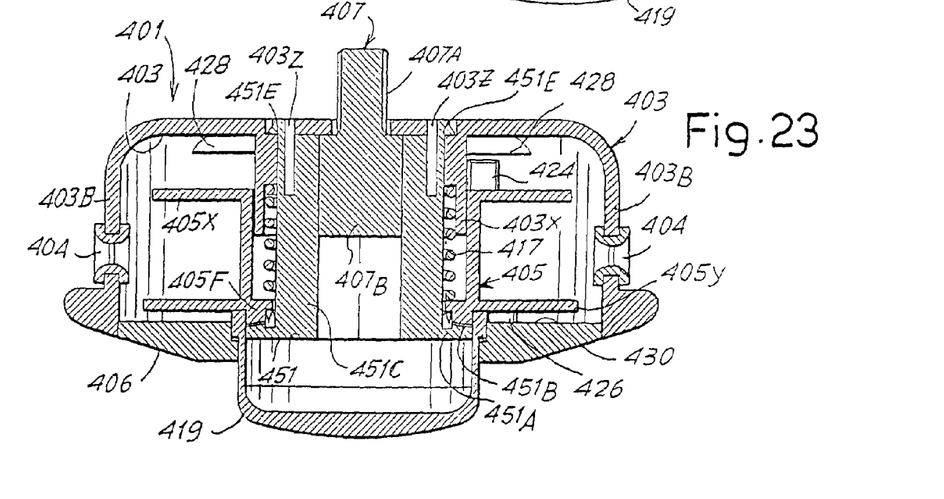
FIG. 23 shows an axial section through another head according to the invention.
Figure 24:
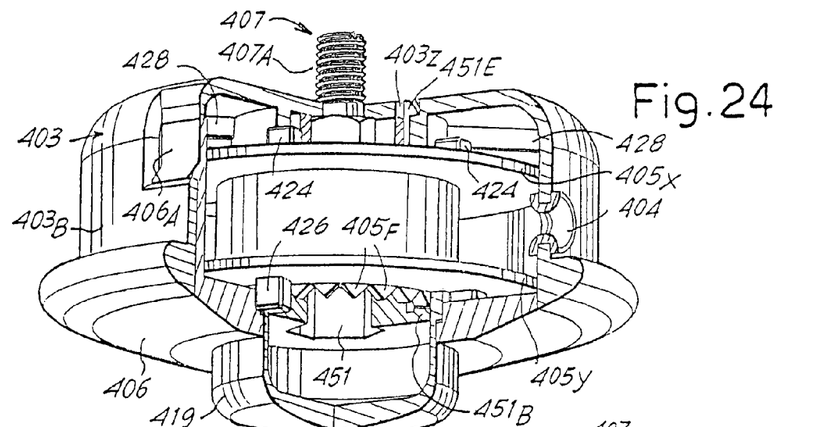
FIGS. 24, 25, 26 show cutaway perspective views, at various angles, of the head shown in FIG. 23.
Figure 25:
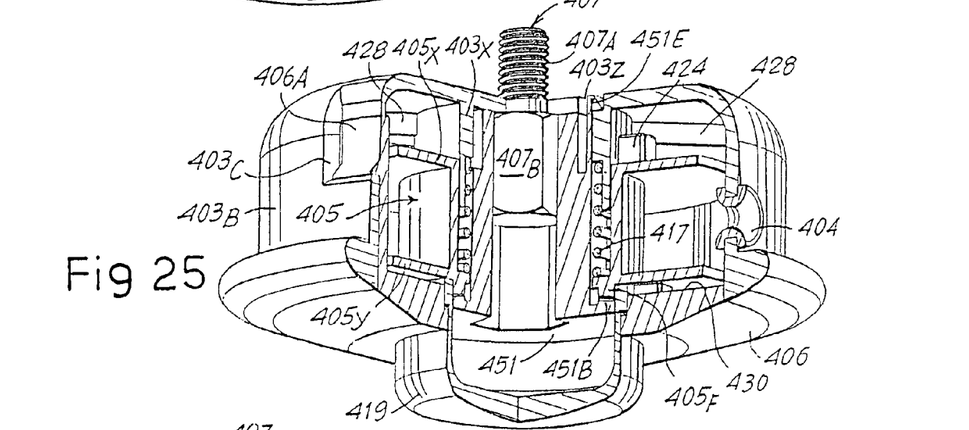
Figure 26:
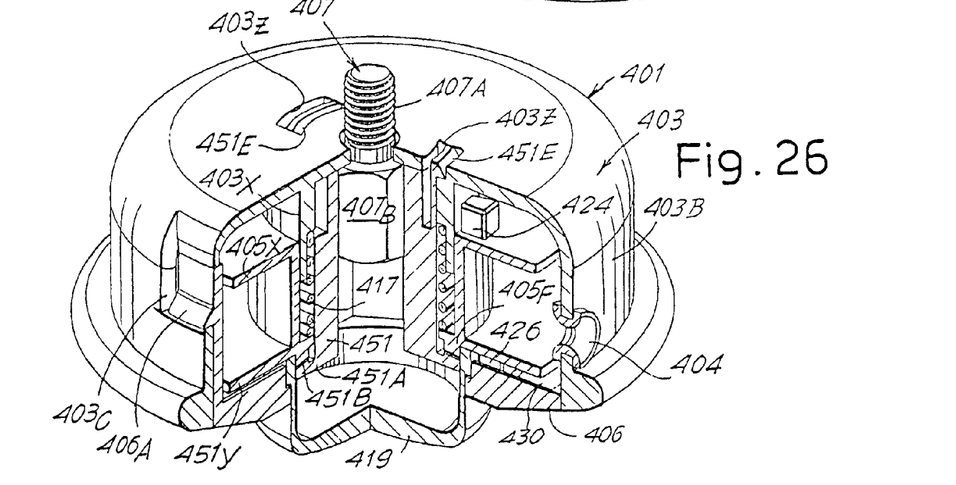

FIGS. 13 and 14 show a variant of the head seen in FIGS. 11 and 12, such that the pegs 341 engage with the upper flange 305X of the spool 305, on the underside of which latter are the teeth 343. Identical numbers indicate parts identical or corresponding to those of FIGS. 11 and 12.

FIGS. 15–18 show, in various cross sections and perspective views, another embodiment of the head according to the invention. The head, designated 401 as a whole, comprises a housing with a main portion 403 that has bushings 404 on its circumferential wall 403B for the cutting line to be passed from the inside to the outside of the housing. The line is wound onto a spool 405 having flanges 405× and 405Y and holes 405D in which the ends of the cutting line are anchored.

407 denotes a hub comprising a threaded projecting end 407A for connection to the brushcutter. 407B denotes a portion of the hub 407 of hexagonal section for transmitting the rotary drive to the head. For this purpose the portion 407B sits in a seat formed in the portion 403 of the housing.

The head is closed on the underside by a cover 406 which is fixed to the portion 403 of the housing by spring-action tabs 406A engaging in windows 403C in the circumferential wall 403B of the housing portion 403. The cover 406 is released by pressing inward from the outside on the spring-action tabs 406A to disengage them from the windows 403C.

The spool 405 is provided with a series of upper teeth 424 and a series of lower teeth 426 which engage with respective stops 428 and 430 on the portion 403 and on the cover 406, respectively. The teeth 424 and 426 and the stops 428 and 430 are angularly offset to allow the cutting line to be fed out gradually step by step from the spool 405 through the bushings 404 to compensate for line wear. To this end the spool 405 is moved axially so that there is alternate engagement between the teeth 426 and the stops 430 on the one hand, and between the teeth 424 and the stops 428 on the other.

The axial movement of the spool 405 is brought about by pressure on the actuating slider 419 which pushes the spool 405 up, overcoming the elastic force of the spring-action member 417 which is situated between a collar 403X (integral with the portion 403 of the housing) and an annular shoulder 405S on the spool 405.

To prevent the spool 405 from escaping from the seat formed by the housing portion 403 when the cover 406 is removed by detaching the spring-action tabs 406A from the windows 403C, there is an axial retention member 451 comprising a lower plate 451A and spring-action tabs 451E that engage in windows 403Y formed in the collar 403X integral with the housing portion 403.

The discoidal portion 451A of the retention member 451 has teeth 451B engaging with corresponding teeth 405F on the spool 405. The teeth 451B and 405F form anti-rotation means to prevent spontaneous rotation of the spool 405 in the unwinding direction while a new supply of line is being wound on. This operation takes place as follows. The actuating slider 419 is removed together with the cover 406, exposing the lower surface of the spool 405, which is held in place, along with the spring-action member 417, by the retention members 451. The new supply of line is passed in from the outside through the bushings 404 and the operator can easily engage the initial end of a length of line in the corresponding hole 405D formed on the spool. By hand, using the teeth 426 to assist, the user winds a supply of line onto the spool 405 by rotating it in the winding direction. The torque applied by the operator on the spool generates an axial force through the teeth 405F, 451B, which overcomes the force of the spring-action member 417, allowing the teeth 405F to ride over the teeth 451B so that the spool 405 rotates in the winding direction. The force of the spring 417 and the shape of the teeth 451B, 405F are sufficient to prevent spontaneous rotation in the opposite direction.

Once the new supply of line has been wound on, the housing can be reclosed by once again fitting on the cover 406 with a snap-action, having first inserted the actuating slider 419 into its central seat in the cover 406.

FIGS. 19–22 show a modified embodiment of the head seen in FIGS. 15–18. Identical numbers indicate parts identical or corresponding to those of the embodiment seen in FIGS. 15–18.

The embodiment shown in FIGS. 19–22 differs in the different method of anchorage of the retention members 451, which in this case are fixed to the axial hub 407 which extends down into the lower region of the head, where a screw 408 fastens the retention members 451 consisting of a disk 451A with the teeth 451B.

FIGS. 23–26 show a modified embodiment of the head seen in FIGS. 15–18. This embodiment differs from the previous embodiment by having a different design of the retention members 451 of the spool 405. Identical or corresponding parts are indicated by the same reference numbers as were used in FIGS. 15–18.

In this embodiment the retention members 451 are held in place by spring-action fingers again marked 451E in end windows marked 403Z in the top surface of the housing portion 403. In this version the seat for the hub 407 is formed in a sleeve 451C in the retention members 451, rather than directly on the housing portion 403 as in FIGS. 15–18. The latter portion again has a collar 403X coaxial with the sleeve 451C of the retention members 451, forming a stop for the spring-action member 417 which is housed between this stop and an annular stop formed in the internal through hole of the spool 405. The retention members 451 again comprise a discoidal terminal portion 451A that forms end teeth 451B engaging with the teeth 405F of the spool.

The retention members 451 may also be formed in one piece with the housing portion 403 and may have spring-action tabs at the lower end for engagement on the spool. This solution is illustrated diagrammatically in FIGS. 27 and 28, where identical numbers denote parts identical or corresponding to those of FIGS. 23–26. The retention members 451 again retain the spool 405 in its position against the action of the spring-action member 417. They consist in the present case of spring-action tabs extending axially through the inside of the housing portion 403, and have end teeth engaging with the teeth 405F of the spool.

Figures 27, 28, 29:
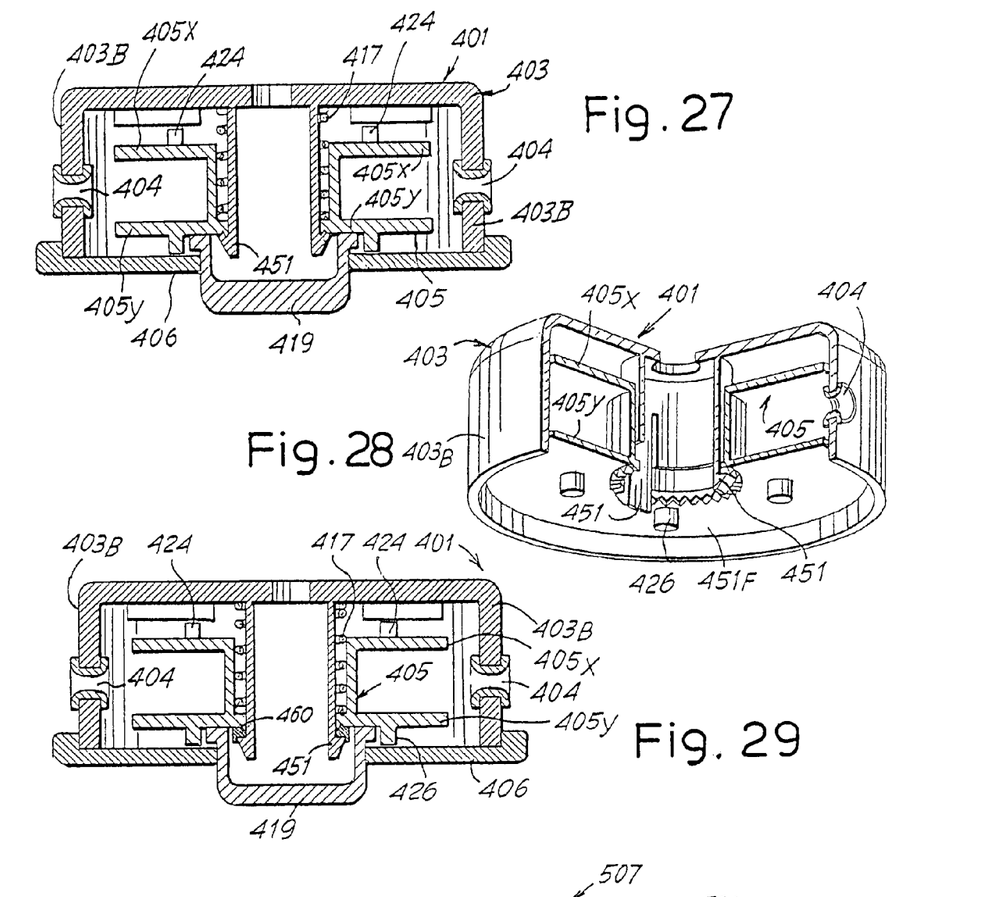
FIG. 27 shows an axial section through another embodiment of the head according to the invention.
FIG. 28 shows a cutaway perspective view, with parts removed, of the head shown in FIG. 27.
FIG. 29 shows an axial section through a modified embodiment of the head shown in FIG. 27.

The spool can be removed from the housing by radially compressing the spring-action tabs forming the retention members 451, whereas in the previous version release was by acting on the tabs 451E.

FIG. 29 shows an embodiment with some slight modifications compared with that of FIGS. 27 and 28. In this version the mutually meshing end teeth on the retention members 451 and on the spool 405F are replaced by a ring 460 of friction material interposed between the tabs forming the retention members 451 and the lower surface of the spool 405. This solution, which involves using a friction material rather than a toothed coupling to prevent or hinder sponta-neous rotation in the unwinding direction, can also be adopted in the embodiments described earlier.

FIGS. 30–33 show yet another embodiment of the head according to the invention. The head, which bears the general reference 501, comprises a housing formed largely by a main portion 503 with a circumferential wall 503B containing outlet bushings 504 for the cutting line which is wound onto a spool 505 housed inside the housing. The spool has flanges 505X and 505Y with teeth 524 and 526 projecting outward from the flanges 505X, 505Y so as to engage with respective stops 528 and 530. In this version the stops 530 are formed on the bottom of the housing portion 503, while the stops 528 are formed on the inner wall of a cover 506 which fits above the housing portion 503 to close the housing. The cover 506 is held in place by spring-action tabs 503C extending axially along the circumferential wall 503B of the housing portion 503.

Around the circumferential wall 503B are windows 503D into which spring-action tabs 561E belonging to retention members with the general reference 561 engage. These retention members define an annular seat 561S that runs around an axial sleeve 506M formed in one piece with the cover 506. Around the sleeve 506M is a spring-action member 517 formed by a helical spring which is contained between the seat 561S and the upper surface of the upper flange 505X of the spool 505. The spring-action member 517 thus pushes the spool 505 against an actuating slider 519 projecting down from the housing portion 503.

The cover 506 is traversed by a hub 507 with the threaded portion 507A and a hexagonal-section portion 507B which is coupled in torsion in a seat of similar cross section formed in the sleeve 506M of the cover 506. The threaded portion 507A of the hub 507 fits onto the brushcutter, and the hub itself transmits the rotation to the head 501.

Figure 30:
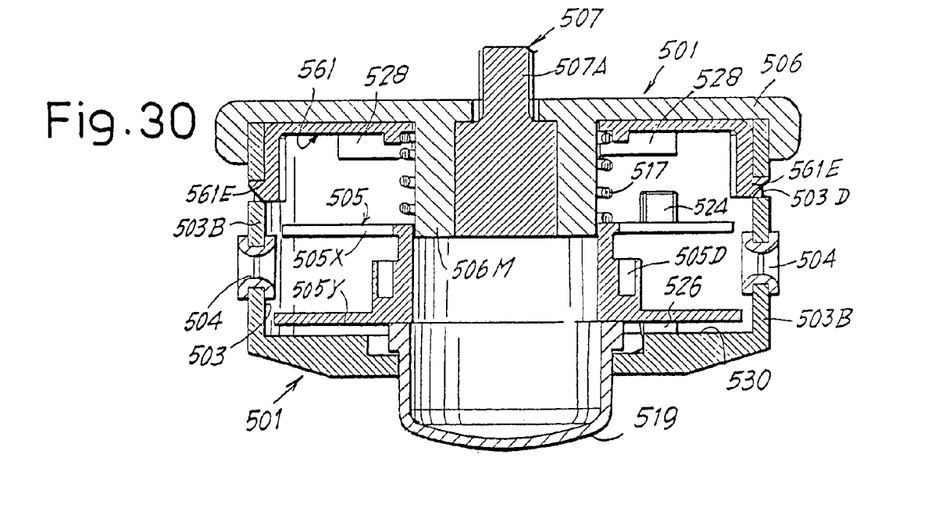
FIG. 30 shows an axial section through another embodiment according to the invention.
Figure 31:
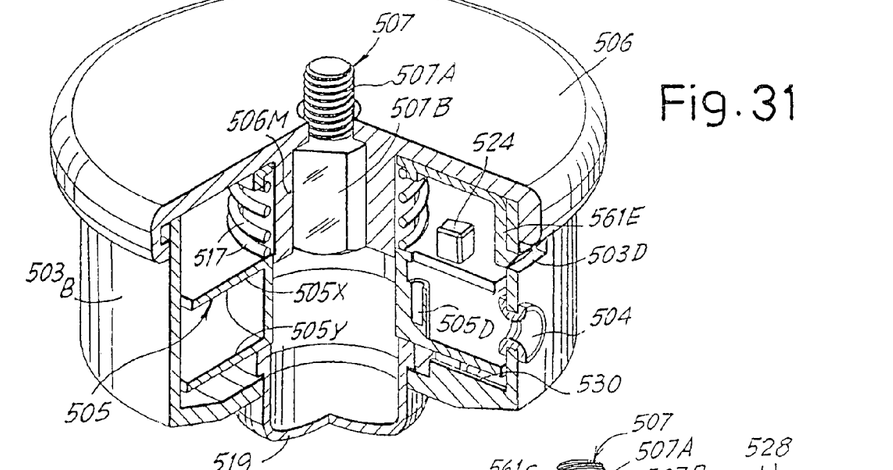
FIGS. 31, 32, 33 show cutaway perspective views at various angles of the head shown in FIG. 30.

As in the previous versions, the cutting line is fed by pressing the actuating slider 519 in so that it overcomes the force of the spring-action member 517 and displaces the spool 505 axially to bring the teeth 524 and 526 into engagement alternately with the stops 528 and 530, respectively. The angular offset between the teeth 524, 526 and the stops 528, 530 allows the spool 505 to rotate in steps under the impulse of centrifugal force when the head 501 is spinning, thus giving a gradual lengthening of the cutting line. When the latter is exhausted a new supply of cutting line can be inserted into the spool 505 without removing the spring-action member 517 and said spool, simply by removing the cover 506 by applying pressure to the two spring-action tabs 503C. This allows access from the outside to the upper part of the spool 505 so that the user can insert the initial end of a new supply of line from the outside through the bushings 504 and anchor this end of the line to the spool, for example by pushing it into the holes 505D as shown in FIG. 30. Winding is by rotating the spool in the winding direction.

Figure 32:
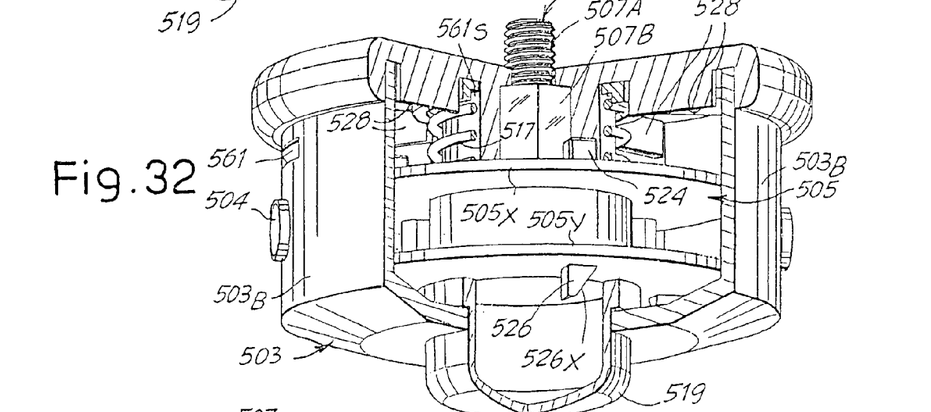
Figure 33:
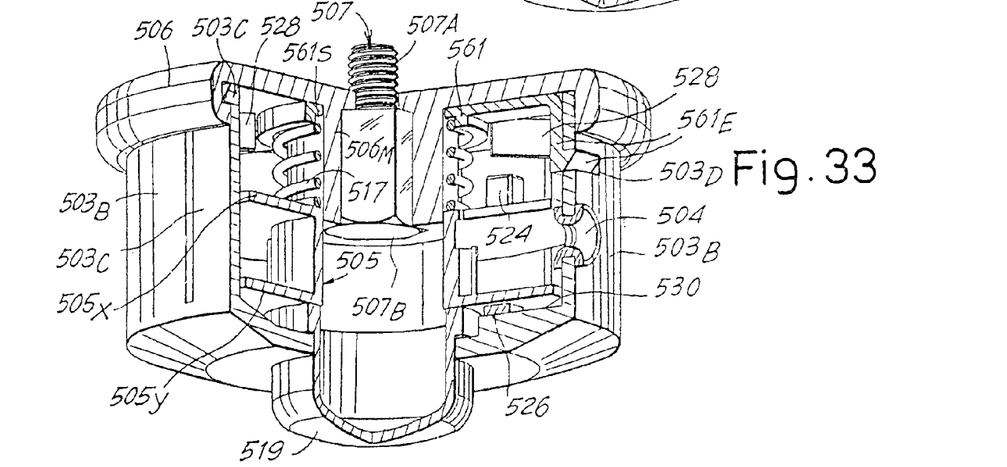

Rotation is permitted because the lower teeth 526 are sloping on one side as shown at 526X in FIG. 32. This allows the teeth 526 to ride over the stops 530 when a torque is applied to the spool 505 in the winding direction. Spontaneous rotation in the cutting line unwinding direction is prevented by the surfaces of the teeth 526 parallel to the axis of the head, which butts against the stops 530.

If it is wished to strip the head completely, all that is required is to push the spring-action tabs 561E in out of the windows 503D of the housing portion 503.

It will be understood that the drawing shows only an example purely as a practical demonstration of the invention, which invention can be varied in its shapes and

What I claim is:

1. A grass-cutting head with a line, the head comprising:
a housing;
at least one spool placed in said housing and on which a line can be wound in a winding area, said spool including an anchor located within the winding area of the spool for holding an end of the line, said anchor being arranged proximate to an inner winding surface of said spool and corresponding in location to an access slot in a surface of said spool so that the anchor is accessible to an operator from outside said housing to enable the end of the line to be connected to said anchor of said spool without taking said spool out of said housing;
a feed mechanism in said housing for feeding the line from said spool;
a winding mechanism in said housing for rotating said spool to enable a supply of the line to be wound onto said spool;
a stop connected to said housing to hold said spool in said housing while the line is being connected to said anchor, said stop and said anchor being arranged and sized to have said anchor be accessible.

2. A grass-cutting head in accordance with claim 1, wherein:
said winding mechanism rotates said spool from outside at least a portion of said housing without taking said spool out of said housing;
said stop holds said spool in said housing while said supply of line is being wound onto said spool.

3. A grass-cutting head in accordance with claim 1, wherein:
said stop and said anchor are arranged spaced from each other in a radial direction of said spool.

4. A grass-cutting head in accordance with claim 1, wherein:
said spool defines a center opening;
said stop and said housing connect to each other though said center opening of said spool;
said stop extends radially outward further than said center opening of said spool.

5. A grass-cutting head in accordance with claim 4, wherein:
said anchor is arranged radially farther outward than said stop.

6. A grass-cutting head in accordance with claim 1, wherein:
said anchor defines a line receiving hole opening in an axial direction of said spool.

7. A grass-cutting head in accordance with claim 1, wherein:
said feed mechanism includes a spring-action member,
said stop opposes action of said spring-action member when the head is opened to render said spool accessible from the outside;
said spool defines a plurality of said access slots providing access to a corresponding plurality of said anchors.

8. A grass-cutting head in accordance with claim 7, wherein:
said stop includes retention members that act against the force of said spring-action member, preventing said spring action member from escaping from the housing when the housing is open to enable said supply of cutting line to be wound onto the spool;
said stop includes a support connected to said housing, said support rotatably holding said spool between said housing and said support;
an annular cover is connected to said housing and covers a side of said spool diametrically opposite said housing, said annular cover covers said access slots.

9. A grass-cutting head as claimed in claim 7, wherein:
said stop includes retention members that act against the force of said spring-action member, preventing said spring action member from escaping from the housing when the housing is open to enable said supply of cutting line to be wound onto the spool;
said spool presses, under the action of said spring-action member, against said retention members integral with the housing.

10. A grass-cutting head as claimed in claim 9, wherein:
said retention members comprise anti-rotation means for manual rotation of the spool in a winding direction and prevent or obstruct rotation in an unwinding direction, said antirotation means being fitted between the said retention members and said spool.

11. A grass-cutting head as claimed in claim 10, wherein said anti-rotation means comprise a layer of friction material.

12. A grass-cutting head as claimed in claim 10, wherein said anti-rotation means comprise teeth.

13. A grass-cutting head as claimed in claim 12, wherein said teeth are integral with the spool.

14. A grass-cutting head as claimed in claim 13, wherein said teeth engage with said retention members.

15. A grass-cutting head as claimed in claim 13, wherein said retention members have complementary teeth to the teeth on the spool.

16. A grass-cutting head as in claim 9, wherein said retention members comprise one or more projections integral with a circumferential wall of the housing and projecting into its interior to form a rest for said spool.

17. A grass-cutting head as claimed in claim 16, wherein said projection includes an annular collar.

18. A grass-cutting head as claimed in claim 16, wherein said projections include tabs spaced apart and forming resting points distributed circumferentially around the periphery of said spool.

19. A grass-cutting head as claimed in claim 16, wherein said projections include radial pegs spaced apart and forming resting points distributed circumferentially around the periphery of said spool.

20. A grass-cutting head as claimed in claim 16, wherein said projection or projections are mounted on the circumferential wall of the housing.

21. A grass-cutting head as claimed in claim 20, wherein said retention members include a system of elastic snap engagements extending through an axial through hole in said spool in order to engage on said housing.

22. A grass-cutting head as claimed in claim 21, wherein said retention members comprise a sleeve extending axially through said axial hole of the spool and ending in snap-engaging spring-action tabs, in the interior of which is a seat for engagement of an axial hub, said seat having a cross section such as to be coupled in torsion with the said axial hub.

23. A grass-cutting head as claimed in claim 16, wherein said projections include spring-action tabs formed in one piece with said circumferential wall of the housing.

24. A grass-cutting head as claimed in claim 9, wherein said retention members are located in the central region of the spool.

25. A grass-cutting head as claimed in claim 24, wherein said retention members are engaged on an axial hub in the head.

26. A grass-cutting head as claimed in claim 24, wherein said retention members comprise spring-action projections integral with said housing and extending through an axial through hole in the spool, for snap engagement with the edge of said spool.

27. A grass-cutting head as claimed in claim 9, wherein said retention members include a collar coaxial with the spool engaged on the circumferential wall of the housing and forming a retention stop for said spring-action member.

28. A grass-cutting head as claimed in claim 27, wherein said collar is integral with fasteners forming spring-action tabs that engage in corresponding seats let into the circumferential wall of the housing.

29. A grass-cutting head in accordance with claim 1, wherein:
said feed mechanism comprise in combination an actuating slider, a first series of feeding teeth integral with said spool and a second series of feeding teeth integral with said spool, feed teeth of the first series engaging with a first feed stop or group of feed stops rotationally fixed to said housing and feed teeth of the second series engaging with a second feed stop or group of feed stops rotationally fixed to said housing, positions of arrest of said spool defined by the first series of feed teeth and by the first feed stop or group of feed stops being angularly offset relative to positions of arrest of said spool defined by the second series of feed teeth and by the second feed stop or group of feed stops;
and movement of said actuating slider causes an axial movement of the spool between two positions to bring the feed teeth of the first series or the feed teeth of the second series alternately into engagement with their respective feed stops, the spring-action member exerting a force on the spool.

30. A grass-cutting head in accordance with claim 29, wherein:
said housing includes a housing portion through which extends an axial hub of a rotary drive, and said spool being placed around said housing portion;
said stop includes a support connected to said housing, said support rotatably holding said spool between said housing and said support, said support defining axially elongated openings;
said first feed stop and said second feed stop are connected to said actuating slider, said first and second feed stops pass through said axially elongate openings in said support and engage with said feed teeth on the spool; and
an annular cover closes said housing and extends around the support for said spool.

31. A grass-cutting head in accordance with claim 30, wherein:
said support has winding teeth engaging with corresponding winding teeth on said housing portion.

32. A grass-cutting head in accordance with claim 31, wherein:
said winding teeth are shaped so as to allow rotation of the support and of the spool in a winding direction and prevent rotation in an opposite direction.

33. A grass-cutting in accordance with claim 30, wherein:
said support for said spool has a cylindrical wall around which the spool is placed and said support also includes a supporting cola supporting said spool.

34. A grass-cutting head in accordance with claim 33, wherein:
said support has a cylindrical support in which said actuating slider moves, the actuating slider being elastically pressed by said spring-action member.

35. A grass-cutting head in accordance with claim 33, wherein:
a generally cylindrical closing wall extends from said supporting collar, said annular cover is mounted on said cylindrical closing wall.

36. A grass-cutting head in accordance with claim 35, wherein:
a circular skirt defines a circumferential wall of the housing, said annular cover has an edge that embraces said circular skirt.

* * * * *